(12) United States Patent
Harper

(10) Patent No.: US 10,680,661 B2
(45) Date of Patent: Jun. 9, 2020

(54) MONOPOLE AND SLOT ANTENNA ASSEMBLY

(71) Applicant: Microsoft Technology Licensing, LLC, Redmond, WA (US)

(72) Inventor: Marc Harper, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 70 days.

(21) Appl. No.: 15/838,150

(22) Filed: Dec. 11, 2017

(65) Prior Publication Data

US 2019/0181891 A1  Jun. 13, 2019

(51) Int. Cl.
| | | |
|---|---|---|
| *H04M 1/00* | (2006.01) |
| *H04B 1/00* | (2006.01) |
| *H04L 27/00* | (2006.01) |
| *H01Q 1/24* | (2006.01) |
| *H01Q 1/22* | (2006.01) |
| *H01Q 5/378* | (2015.01) |
| *H01Q 13/10* | (2006.01) |
| *H01Q 21/28* | (2006.01) |
| *H01Q 9/42* | (2006.01) |

(Continued)

(52) U.S. Cl.
CPC ......... *H04B 1/0064* (2013.01); *H01Q 1/2258* (2013.01); *H01Q 1/243* (2013.01); *H01Q 5/307* (2015.01); *H01Q 5/378* (2015.01); *H01Q 7/00* (2013.01); *H01Q 9/42* (2013.01); *H01Q 13/10* (2013.01); *H01Q 13/16* (2013.01); *H01Q 21/28* (2013.01); *H04L 27/0002* (2013.01)

(58) Field of Classification Search
CPC .... H04B 1/0064; H01Q 5/378; H01Q 1/2258; H01Q 13/10
See application file for complete search history.

(56) References Cited

U.S. PATENT DOCUMENTS

| 9,748,668 B2 * | 8/2017 | Wang | H01Q 1/243 |
| 2009/0174606 A1 * | 7/2009 | Qian | H01Q 1/368 |
| | | | 343/700 MS |

(Continued)

FOREIGN PATENT DOCUMENTS

| EP | 3096398 A1 | 11/2016 |
| WO | 2016125556 A1 | 8/2016 |

OTHER PUBLICATIONS

"International Search Report and Written Opinion Issued in PCT Application No. PCT/US18/062383", dated Feb. 18, 2019, 13 pages.

*Primary Examiner* — Md K Talukder

(74) *Attorney, Agent, or Firm* — Holzer Patel Drennan

(57) ABSTRACT

The herein described technology provides a hybrid monopole and slot antenna assembly including an electrically-driven monopole antenna and a parasitic slot antenna. The electrically-driven monopole antenna is fed by a feed line coupled to a first metal portion of a device case exterior, and the parasitic slot antenna is capacitively-driven by a radiating feed element embedded in a dielectric material that resonates a second metal portion of the device case exterior. The hybrid monopole and slot antenna assembly further includes a dielectric gap insert electrically separating the first metal portion of the device case exterior from the second metal portion of the device case exterior, and a modem that drives the electrically-driven monopole antenna at a first frequency and the parasitic slot antenna at a second different frequency.

22 Claims, 4 Drawing Sheets

(51) Int. Cl.
*H01Q 13/16* (2006.01)
*H01Q 5/307* (2015.01)
*H01Q 7/00* (2006.01)

(56) References Cited

U.S. PATENT DOCUMENTS

| | | | |
|---|---|---|---|
| 2014/0292587 A1* | 10/2014 | Yarga | H01Q 1/243 |
| | | | 343/702 |
| 2014/0315592 A1* | 10/2014 | Schlub | H04B 1/3838 |
| | | | 455/522 |
| 2014/0354504 A1* | 12/2014 | Kuo | H01Q 1/48 |
| | | | 343/848 |
| 2015/0155614 A1 | 6/2015 | Youn et al. | |
| 2016/0344439 A1* | 11/2016 | Seol | G06F 1/1656 |
| 2017/0264722 A1* | 9/2017 | Zhong | H04M 1/0249 |

* cited by examiner

MONOPOLE AND SLOT ANTENNA ASSEMBLY

BACKGROUND

Antennas for computing devices present challenges relating to receiving and transmitting radio waves at one or more select frequencies. These challenges are magnified by the current trend to include several different antennas operating at various frequencies in a single computing device. If not properly spaced from one another, antenna signals can couple together and reduce system performance. Small computer electronics offer fewer antenna spacing possibilities, limiting design options. Further, antenna performance can be negatively affected when certain designs are coupled with certain placement options. For example, the effective bandwidth of some antennas may be altered if a user places a hand in physical contact with certain antenna components.

BRIEF DESCRIPTIONS OF THE DRAWINGS

SUMMARY

The herein described technology provides a hybrid monopole and slot antenna assembly including an electrically-driven monopole antenna and a parasitic slot antenna. The electrically-driven monopole antenna includes a first metal portion of a device case exterior that radiates responsive to signal delivered along a feed line, while the parasitic slot antenna is capacitively-driven by a radiating feed element embedded in a dielectric material bounded by a second metal portion of the device case exterior. A dielectric gap insert electrically separates the first metal portion of the device case exterior from the second metal portion of the device case exterior, and a modem that drives the electrically-driven monopole antenna at a first frequency and the parasitic slot antenna at a second different frequency.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

Figure 1:
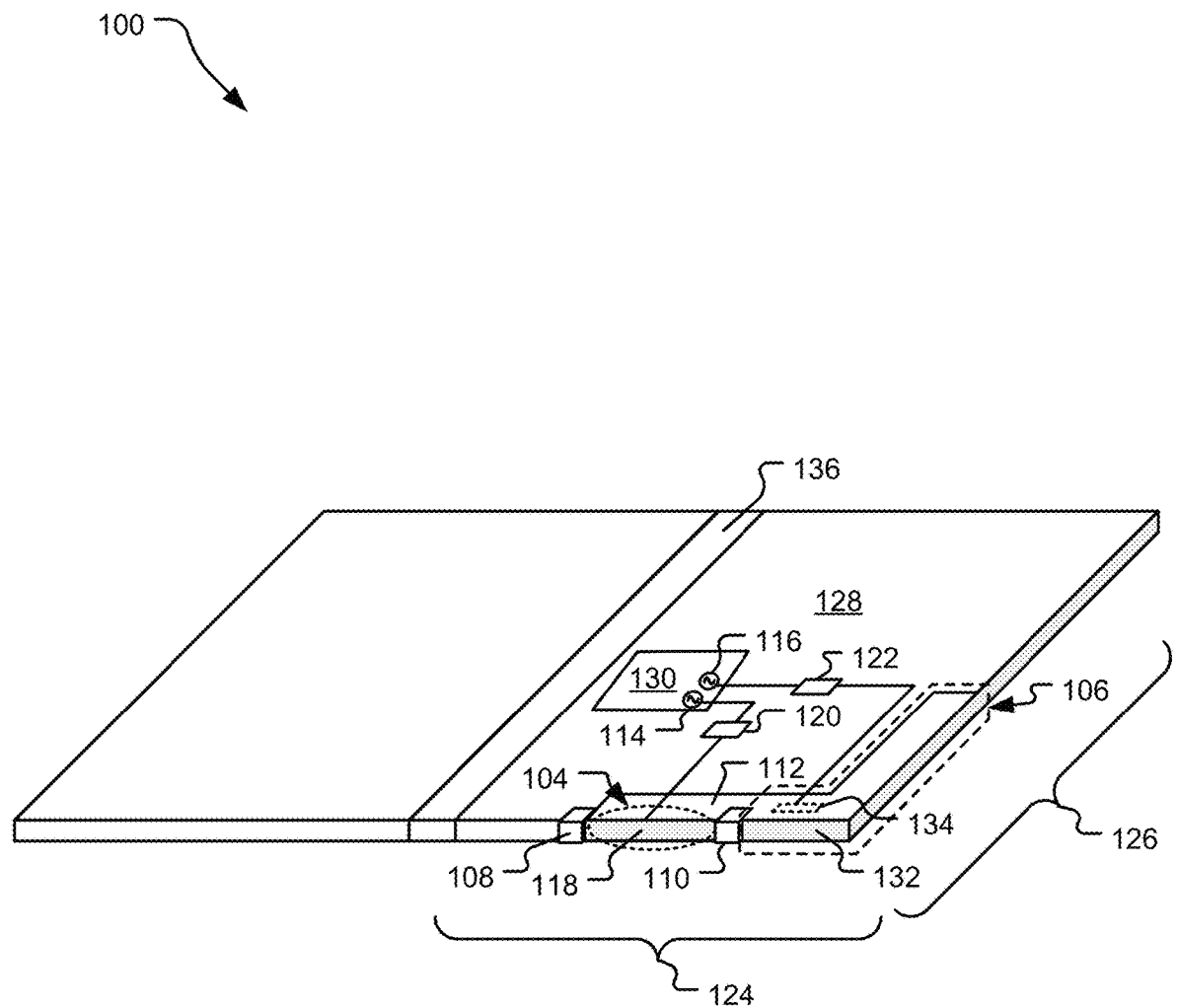
FIG. 1 illustrates an electronic device including an example hybrid monopole and slot antenna assembly for dual band radio-frequency (RF) transmissions.

FIG. 1 illustrates an electronic device 100 including an example hybrid monopole and slot antenna assembly 102 for dual band radio-frequency (RF) transmissions. The hybrid monopole and slot antenna assembly 102 is formed in corner edge region of the electronic device 100 and includes features dual-purposed to transmit RF signals and also provide structural functionality, such as to form portions of the device exterior and/or edges or surfaces of interior device components.

The hybrid monopole and slot antenna assembly 102 includes a monopole antenna 104 and a slot antenna 106 that are electrically isolated from one another so as to facilitate independent or simultaneous operation in two different frequency bands. In one implementation, the monopole antenna 104 and the slot antenna 106 are configured to operate at two different cellular frequency bands, such as in a low cellular band (e.g., 850 MhZ) and a high cellular band (e.g., 1.9 GHz). Tuning elements 120 and 122 may facilitate adjustments of the operational frequency of each of the monopole antenna 104 and the slot antenna 106, respectively. In other implementations, the monopole antenna 104 and the slot antenna 106 are adapted to radiate in other frequency bands, including non-cellular bands (e.g., Wi-Fi, satellite, Bluetooth).

Although the hybrid monopole and slot antenna assembly 102 may, in different implementations, be formed in different regions of the electronic device 100, FIG. 1 shows the hybrid monopole and slot antenna assembly 102 in a corner region. Each of the monopole antenna 104 and the slot antenna 106 includes components that form part of a first side surface 124 of an exterior surface of the electronic device 100.

In FIG. 1, the monopole antenna 104 includes a first metal portion 118 electrically coupled to a feed source 114 driven by a modem 130. The first metal portion 118 forms a portion of the first side surface 124 of the electronic device 100 that radiates responsive to receipt of an electrical signal provided by the feed source 114. The first metal portion 118 is electrically isolated from other metal components of the first side surface 124 by two dielectric gap inserts—a first dielectric gap insert 108 and a second dielectric gap insert 110. In one implementation, the first dielectric gap insert 108 and the second dielectric gap insert 110 are separately formed and, during assembly of the electronic device 100, inserted into notches formed in a device casing (e.g., a metal chassis forming the exterior surfaces of the electronic device 100). For example, the first dielectric gap insert 108 and the second dielectric gap insert 110 are inserted into notches formed along the first side surface 124 after all other components of the hybrid monopole and slot antenna assembly 102 are affixed at their respective positions within the electronic device 100.

The first dielectric gap insert 108 and the second dielectric gap insert 110 isolate opposite ends of the first metal portion 118 by creating electrical nulls that prevent current from flowing between the first metal portion 118 and other metal portions of the first side surface 124. Isolation of the first metal portion 118 is further provided by a dielectric material 112 filling a continuous cutout (e.g., a generally L-shaped cutout) formed in an edge of a ground plane 128. The dielectric material 112 separates the radiating component (e.g., the first metal portion 118) of the monopole antenna 104 from a ground plane 128 and also fills a radiating slot of the slot antenna 106.

The slot antenna 106 includes a radiating slot formed by conductive edges surrounding a portion of the dielectric material 112. Inside edges of the radiating slot (e.g., edges furthest from the device exterior) are formed by a ground plane 128, while outside edges of the radiating slot are formed by a second metal portion 132 of the first side surface 124 that wraps around a corner of the electronic device 100 to also form a portion of the second side surface 126. The slot antenna 106 is capacitively-fed by a radiating element 134 embedded within the dielectric material 112 that is coupled to a feed source 116 driven by the modem 130. The slot antenna 106 is not electrically connected to other components and is, for that reason, also referred to herein as a "parasitic slot antenna." The second dielectric gap insert 110 acts as an electrical null, effectively isolating the slot antenna 106 from the monopole antenna 104.

In FIG. 1, the electronic device 100 is a mobile device foldable about a hinge 136. In other implementations, the electronic device 100 may assume a variety of different forms and sizes including without limitation various tablets, laptop computers, mobile phones, smart watches, and other mobile electronics. Due to its compact design, the hybrid monopole and slot antenna assembly 102 is suitable for implementation in diverse types of electronics of variable sizes and forms. In addition, design manufacturing is simplified as compared to other dual-antenna arrangements due, in part, to the sharing of certain components between the two antennas (e.g., the dielectric material 112) and the dual-purposing of some antenna components to provide structural architecture (e.g., radiating elements as side surfaces) for the electronic device 100.

Figure 2:
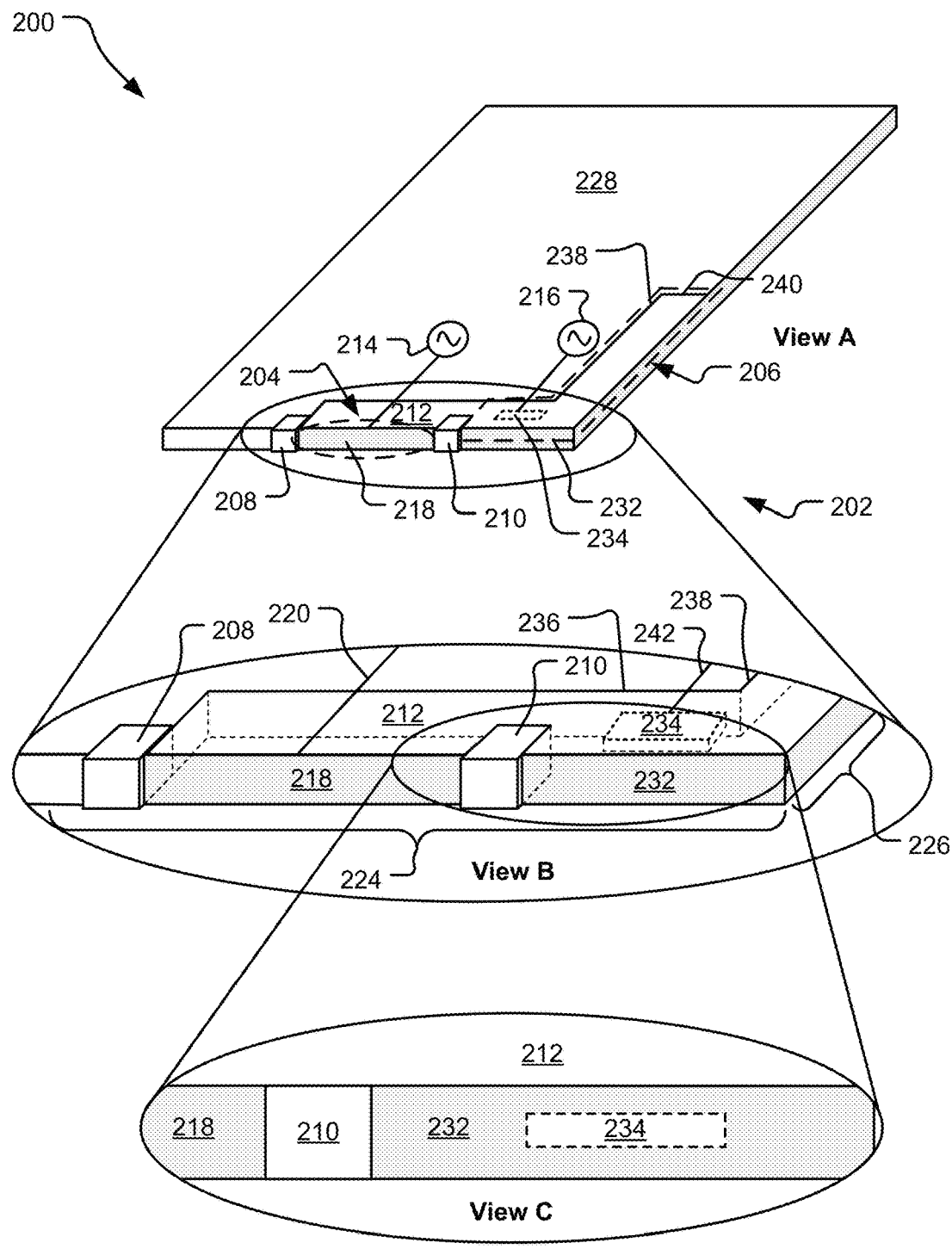
FIG. 2 illustrates another electronic device including an example hybrid monopole and slot antenna assembly for dual band RF transmissions.

FIG. 2 illustrates another electronic device 200 including an example hybrid monopole and slot antenna assembly 202 for dual band RF transmissions. The hybrid monopole and slot antenna assembly 202 includes a monopole antenna 204 and a slot antenna 206 that are electrically isolated from one another so as to facilitate transmission and/or receipt of RF signals in two different frequency bands. In one implementation, the monopole antenna 204 is designed to operate in a lower cellular band (e.g., 850 MHz) and the slot antenna 206 is configured to operate at a different, higher cellular frequency band (e.g., 1.9 GHz).

As shown in perspective View A, the monopole antenna 204 includes a first metal edge component 218 that radiates responsive to receipt of a signal transmitted from a feed source 214 that is delivered along a feed line 220. The first metal edge component 218 forms a portion of a first side surface 224 of an exterior device casing, shown in better detail in magnified perspective View B. The first metal edge component 218 is isolated along a back side (e.g., an inward-facing surface of the first side surface 224) by a dielectric material 212 filling an elongated L-shaped cutout that separates the first metal edge component 218 from a conductive ground plane 228 internal to the electronic device 200. The first metal edge component 218 is also positioned between and isolated by dielectric gap inserts 208 and 210, which form other respective portions of the first side surface 224 of the exterior device casing.

The dielectric material 212 contacts a back-side surface (interior to the electronic device 200) of the first metal edge component 218 of the monopole antenna 204 and also fills a radiating L-shaped slot of the slot antenna 206. In some implementations, the monopole antenna 204 and/or the slot antenna 206 further include tuning elements (not shown) that facilitate selective adjustments of an operational frequency of each of the antennas.

In one implementation, the first metal edge component 218 is non-resonant (e.g., too short in length to naturally resonate at a target frequency), and the monopole antenna 204 is fitted with an inductor (not shown) to drive down the associated resonant frequency by a predetermined amount to allow for transmissions at a targeted high-band frequency.

The dielectric gap inserts 208 and 210 are positioned to contact opposite ends of the first metal edge component 218, forming electrical nulls that prohibit current from flowing along the first side surface 224 between the first metal edge component 218 of the monopole antenna 204 and other metal edge components of the electronic device 200.

The slot antenna 206 includes a slot with a capacitively-fed conductive perimeter. Inside edges of the slot (e.g., edges internal to the electronic device 200) are formed by a first ground plane edge segment 236, a second ground plane edge segment 238, and a third ground plane edge segment 240. Outside edges of the conductive perimeter are, in contrast, formed by a metal portion of the exterior device casing. In FIG. 2, the outside edges of the conductive perimeter of the slot antenna 206 are formed by a second metal edge component 232 that forms a portion of the first side surface 224 before wrapping around a corner to form a portion of the second side surface 226.

The conductive perimeter of the slot antenna 206 is generally L-shaped to surround a portion of the dielectric material 212 that is separate from a portion of the dielectric material 212 abutting the first metal edge component 218 and providing isolation for the monopole antenna 204. The portion of the dielectric material 212 filling the L-shaped conductive perimeter embeds a radiating element 234 that acts as a capacitive feed to radiate the slot antenna 206 at a target frequency. The radiating element 234 is coupled to a feed line 242 that is, in turn, coupled to a feed source 216. Both the feed sources 214 and 216 are driven by a modem 230.

View C of FIG. 2 is cross-sectional view of a portion of the first side surface 224 that illustrates a dotted border indicating a general position of the radiating element 234, embedded within the dielectric material 212 behind the second metal edge component 232. The dielectric gap insert 210 creates an electrical null adjacent to the slot antenna 206 that effectively isolates the slot antenna 206 from the monopole antenna 204.

Figure 3:
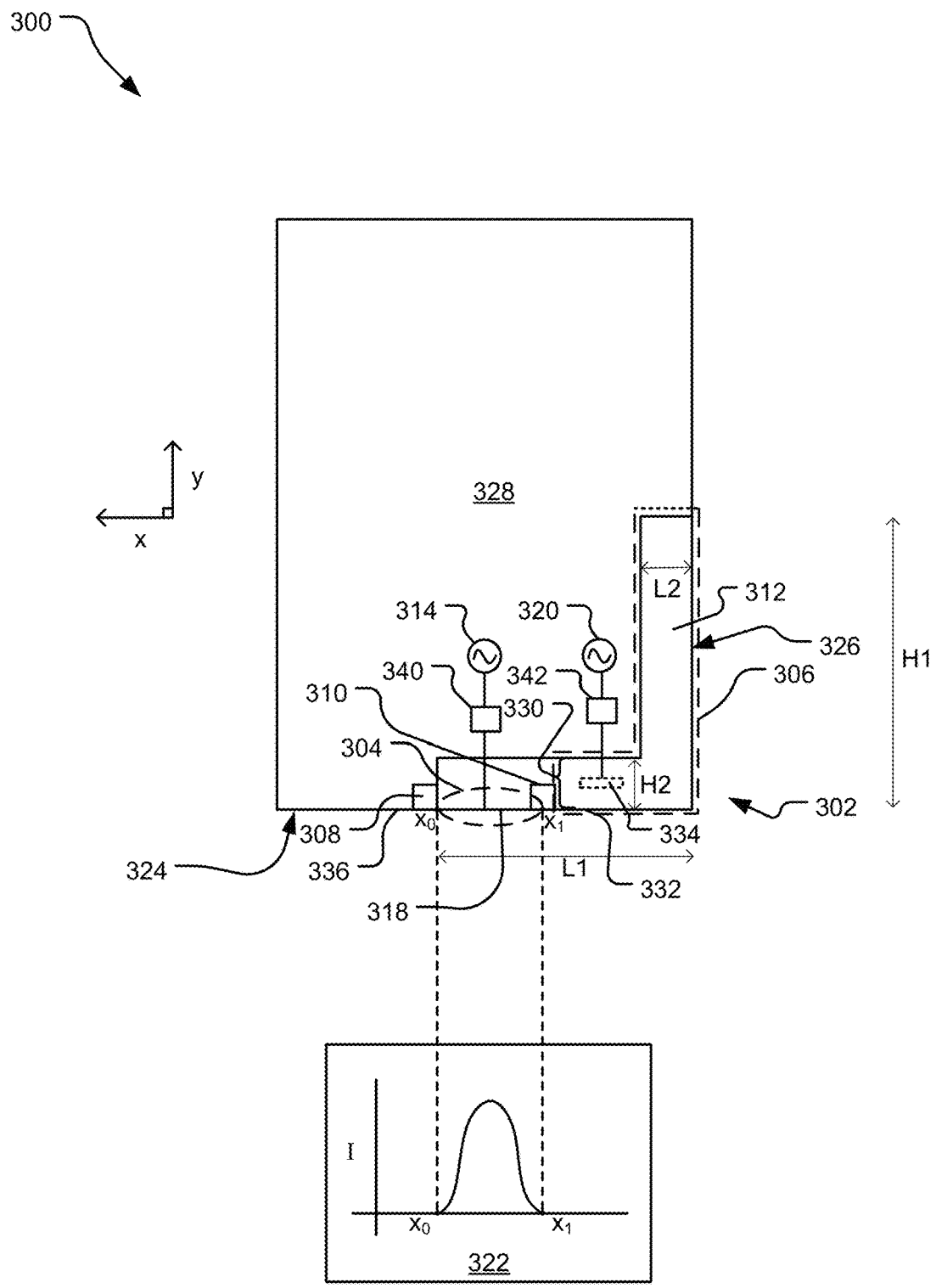
FIG. 3 illustrates a two-dimensional view of an example hybrid monopole and slot antenna assembly integrated within an electronic device.

FIG. 3 illustrates a two-dimensional view of an electronic device 300 including an example hybrid monopole and slot antenna assembly 302. The hybrid monopole and slot antenna assembly 302 includes a monopole antenna 304 and a slot antenna 306 that are electrically isolated from one another so as to facilitate transmission and/or receipt of RF signals in two different frequency bands.

The monopole antenna 304 includes a first metal edge component 318 that forms a portion of a first external side surface 324 of the electronic device 300. The first metal edge component 318 is electrically coupled to a feed source 314 and a tuning circuit 340. The tuning circuit 340 may selectively configure the first metal edge component 318 to resonate at a target frequency and, in some implementations, includes filtering components to prevent resonance of the slot antenna 306 at a first frequency from affecting operation of the monopole antenna 304 at a second frequency. In one implementation, the monopole antenna 304 is non-resonant unless fitted with tuning component, such as an inductor, to drive down the resonating frequency to a target frequency band.

The first metal edge component 318 is electrically isolated from conductive components of the electronic device 300 except for a connection to the feed source 314. An inward-facing surface of the first metal edge component 318 abuts a dielectric material 312 filling a continuous L-shaped cutout slot that separates the first metal edge component 318 from a conductive ground plane 328. The continuous L-shaped slot is formed of two regions that serve different purposes. A first region of the continuous L-shaped slot includes a portion of the dielectric material 312 behind the monopole antenna 304 and internal to the electronic device 300 (e.g., a keep-out zone devoid of other electrical components), while a second region of the continuous L-shaped slot forms the slot antenna 306.

The first metal edge component 318 is further isolated from other components of the first external side surface 324 by a first dielectric gap insert 308 and a second dielectric gap insert 310. The first dielectric gap insert 308 separates the first metal edge component 318 from a second metal edge component 336, while the second dielectric gap insert 310 electrically isolates the first metal edge component 318 from a third metal edge component 332, which forms another portion of the first external side surface 324 and wraps around the corner of the electronic device to also form a portion of a second external side surface 326. In one implementation, the second external side surface 326 is formed of a continuous conductive material.

An example plot 322 illustrates a magnitude of edge current along the first metal edge component 318 when an RF signal is provided by the feed source 314. As shown, the first dielectric gap insert 308 and the second dielectric gap insert 310 create electrical nulls (e.g., at points X0 and X1, respectively) where no or substantially no surface current accumulates. In contrast to this, a surface current maximum is observed in a central area of the first metal edge component 318 proximal to a line coupled to the feed source 314.

The slot antenna 306 is an L-shaped parasitic conductive slot with an opening 330 (e.g., a mouth) abridging a portion of dielectric material 312 space between the second dielectric gap insert 310 and the conductive ground plane 328. When capacitively-fed by a radiating element 334 embedded within the dielectric material 312, surface current flows along a perimeter of the L-shaped parasitic conductive slot between opposing ends of the opening 330. Due to the electrical null created by the second dielectric gap insert 310, the slot antenna 306 is electrically isolated from the monopole antenna 304.

In FIG. 3, the radiating element 334 is electrically coupled to a feed source 320 and a tuning circuit 342. The tuning circuit 342 may be selectively configure the radiating element 342 to resonate at a target frequency, and in some implementations, includes filtering components to prevent resonance of the monopole antenna 304 at a first frequency from affecting operation of the slot antenna 306 at a second frequency.

In one implementation, the monopole antenna 304 is designed to operate in a lower cellular band (e.g., 700 to 960 MHz) and the slot antenna 306 is configured to operate in a higher cellular frequency band (e.g., 700 to 2700 MHz). In another implementation, the dimensions of the monopole antenna 304 and the slot antenna 306 are altered relative to one another such that the monopole antenna 304 resonates in a higher frequency band than the slot antenna 306. For example, a reduction in a height (H1) of the slot antenna 306 may cause an in increase in the corresponding resonant frequency while an increase in the length of the radiating element 318 may cause a decrease in the corresponding resonant frequency.

In different implementations, the various components of the hybrid monopole and slot antenna assembly 302 may assume a variety of suitable shapes and sizes. In one example implementation, the slot antenna 306 includes an L-shaped slot with a first height (H1) of approximately 10 mm and a first length (L1) of approximately 5-15 mm. In the same or another implementation, the dielectric material 312 has a second height (H2) perpendicular to the first external side surface 324 that is approximately 3-5 mm. A second length (L2) is approximately 3-5 mm.

Figure 4:
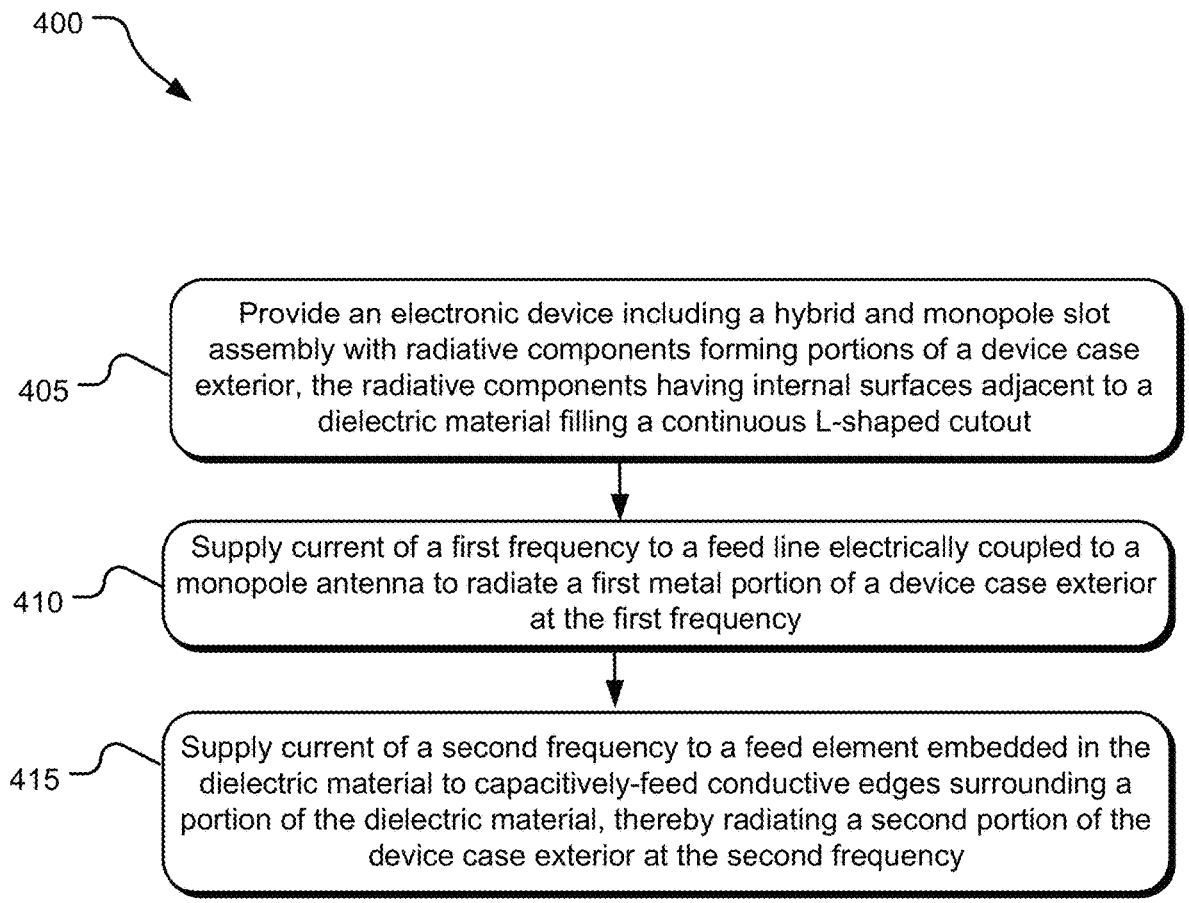
FIG. 4 illustrates example operations for operating a hybrid monopole and slot antenna assembly at one of two selectable frequencies

FIG. 4 illustrates example operations 400 for operating a hybrid monopole and slot antenna assembly at one of two selectable frequencies. A providing operation 405 provides a hybrid and monopole slot antenna assembly formed in a corner region of a mobile electronic device. The hybrid monopole and slot antenna includes an electrically-driven monopole antenna and a capacitively-driven parasitic slot antenna, which each include radiative components forming portions of an exterior of a device case, such as different portions of a metal chassis.

In one implementation, a dielectric gap insert is positioned in a notch formed in an exterior surface of the device case to isolate a radiating portion of the electrically-driven monopole antenna from a radiating portion of the capacitively-driven parasitic slot antenna. Along an internal surface of the device case, the radiating antenna portions are in contact with a dielectric material filling a continuous L-shaped cutout formed in the edge of a ground plane. The dielectric material is positioned to nest within and adjacent to a corner portion of the mobile electronic device, such as in the manner shown and described in any of FIGS. 1-3, above.

A first antenna driving operation 410 drives the monopole antenna by supplying current of a first target frequency to a feed line electrically coupled to a first metal portion of an exterior of the device case. A second antenna driving operation 415 drives the radiating parasitic slot antenna by supplying current of a second target frequency to a feed element embedded in the dielectric material to capacitively-feed conductive edges of the L-shaped cutout surrounding the dielectric material, causing a second metal portion of the device case exterior to radiate at the second target frequency.

An example communications device includes an electrically-driven monopole antenna forming a first metal portion of a device case exterior and a parasitic slot antenna capacitively-driven by a radiating feed element embedded in a dielectric material at least partially bounded by a second metal portion of the device case exterior. A dielectric gap insert electrically separates the first metal portion of the device case exterior from the second metal portion of the device case exterior, and a modem drives the electrically-driven monopole antenna at a first frequency and the parasitic slot antenna at a second different frequency.

In an example communications device of any preceding communications device, the dielectric material of the parasitic slot antenna fills a continuous cutout abutting an inside edge of the first metal portion and the second metal portion.

In another example communications device of any preceding communications device the first metal portion, the second metal portion, and the dielectric gap insert form an edge portion of the device case exterior.

In yet another example communications device of any preceding communications device, the second metal portion of the device case exterior wraps around a corner of the communications device.

In still another example communications device of any preceding communications device, the dielectric material of the parasitic slot antenna is bounded on a first side by a notched edge ground plane and bounded on a second opposite side by the second metal portion of the device case exterior.

In another example communications device of any preceding communications device, the electrically-driven monopole antenna forms an edge portion of the device case exterior.

In another example communications device of any preceding communications device, the dielectric material of the parasitic slot antenna wraps around a corner edge portion of the communications device.

In another example communications device of any preceding communications device, the dielectric gap insert abuts a first end of the electrically-driven monopole antenna and another dielectric gap insert abuts a second opposite end of the electrically-driven monopole antenna.

In still another example communications device of any preceding communications device, the electrically-driven monopole antenna is configured to resonate in a lower frequency band than the parasitic slot antenna.

An example antenna system disclosed herein includes an electrically-driven monopole antenna formed as a first portion of a ground plane and a parasitic slot antenna formed as a cutout of a second portion of the ground plane and capacitively-driven by a radiating feed element embedded in a dielectric material adjacent to the ground plane. The antenna system further includes a dielectric gap insert between the first portion and the second portion of the ground plane that electrically separates the electrically-driven monopole antenna from the parasitic slot antenna.

In still another example antenna system of any preceding antenna system, the cutout of the parasitic slot antenna is a continuous cutout filled with a dielectric material abutting the first portion and the second portion of the ground plane.

In another example antenna system of any preceding antenna system, the dielectric material filling the cutout of the parasitic slot antenna wraps around a corner of the ground plane and extends along a portion of at least two side faces of an electronic device.

In yet another example antenna system of any preceding antenna system, the dielectric gap insert abuts a first end of the electrically-driven monopole antenna and another dielectric gap insert abuts a second opposite end of the electrically-driven monopole antenna.

In still another example antenna system of any preceding antenna system, the electrically-driven monopole antenna is configured to resonate in a lower frequency band than the parasitic slot antenna.

A method disclosed herein includes supplying current of a first frequency to a feed line electrically coupled to a monopole antenna forming a first metal portion of a device case exterior, and supplying current of a second frequency to a radiating feed element of a parasitic slot antenna. The radiating feed element is embedded in a dielectric material and capacitively-driving a second metal portion of the device case exterior at least partially bounding the dielectric material, and the first metal portion of the device case exterior is electrically separated from the second metal portion of the device case exterior by a dielectric gap insert.

In an example method of any preceding method, the dielectric material of the parasitic slot antenna fills a continuous cutout abutting an inside edge of the first metal portion and the second metal portion.

In another example method of any preceding method, the first metal portion, the second metal portion, and the dielectric gap insert form an edge portion of the device case exterior.

In yet another example method of any preceding method, the second metal portion of the device case exterior wraps form a corner of the device case exterior.

In still another example method of any preceding method, the first frequency is a lower frequency than the second frequency.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A communications device comprising:
   an electrically-driven monopole antenna forming a first metal portion of a device case exterior of the communications device;
   a parasitic slot antenna capacitively-driven by a radiating feed element embedded in a dielectric material at least partially bounded by a second metal portion of the device case exterior, the second metal portion and the first metal portion forming a same side surface of the device case exterior;
   a dielectric gap insert physically separating the electrically-driven monopole antenna from the parasitic slot antenna and electrically separating the first metal portion of the device case exterior from the second metal portion of the device case exterior; and
   a modem that drives the electrically-driven monopole antenna at a first frequency and the parasitic slot antenna at a second different frequency.

2. The communications device of claim 1, wherein the dielectric material of the parasitic slot antenna fills a continuous cutout abutting an inside edge of the first metal portion and the second metal portion.

3. The communications device of claim 2, wherein the continuous cutout is an L-shaped cutout.

4. The communications device of claim 1, wherein the first metal portion, the second metal portion, and the dielectric gap insert form an edge portion of the device case exterior.

5. The communications device of claim 1, wherein the second metal portion of the device case exterior wraps around a corner of the communications device.

6. The communications device of claim 1, wherein the dielectric material of the parasitic slot antenna is bounded on a first side by a notched edge ground plane and bounded on a second opposite side by the second metal portion of the device case exterior.

7. The communications device of claim 1, wherein the electrically-driven monopole antenna forms an edge portion of the device case exterior.

8. The communications device of claim 1, wherein the dielectric material of the parasitic slot antenna wraps around a corner edge portion of the communications device.

9. The communications device of claim 1, wherein the dielectric gap insert abuts a first end of the electrically-driven monopole antenna and another dielectric gap insert abuts a second opposite end of the electrically-driven monopole antenna.

10. The communications device of claim 1, wherein the electrically-driven monopole antenna is configured to radiate in a lower frequency band than the parasitic slot antenna.

11. The communications device of claim 1, wherein the same side surface formed by the first metal portion and the second metal portion forms a thinnest dimension of the communications device.

12. The communications device of claim 1, wherein the parasitic slot antenna includes an L-shaped resonating portion that forms a corner of the device case exterior.

13. An antenna system comprising:
an electrically-driven monopole antenna formed as a first portion of a ground plane, the electrically-driven monopole antenna forming a first metal portion of a device case exterior;
a parasitic slot antenna formed as a cutout of a second portion of the ground plane and capacitively-driven by a radiating feed element embedded in a dielectric material adjacent to the ground plane, the parasitic slot antenna bounded by a second metal portion of a device case exterior, the first metal portion and the second metal portion forming a same side surface of a device case exterior; and
a dielectric gap insert between the first portion and the second portion of the ground plane that physically separates the first metal portion and the second metal portion and that electrically separates the electrically-driven monopole antenna from the parasitic slot antenna.

14. The antenna system of claim 13, wherein the cutout of the parasitic slot antenna is a continuous cutout filled with a dielectric material abutting the first portion and the second portion of the ground plane.

15. The antenna system of claim 14, wherein the dielectric material filling the cutout of the parasitic slot antenna wraps around a corner of the ground plane and extends along a portion of at least two side faces of an electronic device.

16. The antenna system of claim 13, wherein the dielectric gap insert abuts a first end of the electrically-driven monopole antenna and another dielectric gap insert abuts a second opposite end of the electrically-driven monopole antenna.

17. The antenna system of claim 13, wherein the electrically-driven monopole antenna is configured to radiate in a lower frequency band than the parasitic slot antenna.

18. A method comprising:
supplying current of a first frequency to a feed line electrically coupled to a monopole antenna forming a first metal portion of a device case exterior; and
supplying current of a second frequency to a radiating feed element of a parasitic slot antenna, the radiating feed element embedded in a dielectric material and capacitively-driving a second metal portion of the device case exterior at least partially bounding the dielectric material, the first metal portion and the second metal portion forming a same side surface of the device case exterior, the first metal portion of the device case exterior being electrically separated from the second metal portion of the device case exterior by a dielectric gap insert that physically separates the monopole antenna from the parasitic slot antenna.

19. The method of claim 18, wherein the dielectric material of the parasitic slot antenna fills a continuous cutout abutting an inside edge of the first metal portion and the second metal portion.

20. The method of claim 18, wherein the first metal portion, the second metal portion, and the dielectric gap insert form an edge portion of the device case exterior.

21. The method of claim 18, wherein the second metal portion of the device case exterior wraps form a corner of the device case exterior.

22. The method of claim 18, wherein the first frequency is a lower frequency than the second frequency.

* * * * *